United States Patent [19]
Odams

[11] 3,818,477
[45] June 18, 1974

[54] PULSE-OPERATED RECEIVER
[75] Inventor: Charles E. Odams, Londonderry, N.H.
[73] Assignee: American Standard Inc., New York, N.Y.
[22] Filed: Dec. 31, 1969
[21] Appl. No.: 889,368

[52] U.S. Cl..... 343/105 LS, 343/105 R, 343/112 C
[51] Int. Cl............................................. G01s 1/30
[58] Field of Search ...... 343/105 LS, 105 R, 102 C, 343/102 TC, 102 PT, 100

[56] References Cited
UNITED STATES PATENTS
| | | | |
|---|---|---|---|
| 3,465,340 | 9/1969 | O'Brien et al. | 343/105 |
| 3,471,856 | 10/1969 | Laughlin et al. | 343/105 R |
| 3,623,100 | 11/1971 | Rapp | 343/105 R |

Primary Examiner—Carl D. Quarforth
Assistant Examiner—J. M. Potenza
Attorney, Agent, or Firm—Jefferson Ehrlich; Robert G. Crooks

[57] ABSTRACT

Disclosed is a receiver for a navigation system of the Omega type which operates with pulse-modulated signals. The phase of received and local signals is compared by quantized pulses; phase equalization, commutating gate control, phase tracking, and synchronization of gate patterns with time-sequence input signals are obtained by pulse insertion into, or deletion from, signal loops which contain phase detecting, sequential signal selecting, and readout control components. Phase coincidence is counted cumulatively and is electromechanically stored. Lane position is recorded by pulse insertion. Components are constructed and interrelated to reduce noise and improve selectivity to enhance the benefits obtained by pulsed operation control.

34 Claims, 19 Drawing Figures

PULSE-OPERATED RECEIVER

BACKGROUND OF THE INVENTION

1. Field of the Invention

The invention relates to "radiowave communication systems" (Class 343), and particularly to transmitting beacons of the isophase type producing positiondeterminative signals (Subclass 105).

2. Description of the Prior Art

The rapid increase in volume and speed of long distance ship and airplane traffic has increased the requirement for a reliable worldwide navigational system. It has been found that very-low-frequency (VLF) signals, e.g., on the order of 10 K Hz., have suitable propagation characteristics in that they are detectable at great distances from one transmitting station and they are characterized especially by very-high, phase-delay stability, thus, the phase at a particular position on the earth's surface is predictable by use of these signals. Therefore, navigation systems operating at these frequencies and based on phase-comparison technology are particularly useful. Several variations of such systems have been investigated. Installations which furnish hyperbolic lines of position defined by phase differences of time-shared signals from several transmitting locations are preferred. The reliability and phase stability of VLF propagation makes possible the use of very-long-range, accurate, position-determining signals for establishing a hyperbolic line system wherein position is defined by the points of phase coincidence of a pair of signals received respectively from each of at least two precisely synchronized transmitters. The hyperbolic lines of position are plotted, for instance, on a navigation chart, to produce grid lines, and these lines are separated by "lanes" whose width depends on the wave length of the transmitted signal. Phase coincidences of a synchronized wave generator on the ambulating craft whose position is to be determined with the signals producing the grid lines traversed by the craft furnish a fix and course trace. In order to obtain a fix, signals must be received and processed from at least three transmitting stations. One system of the type described is the OMEGA Navigation System. The Omega system and other similar systems are described in the literature, for example, in "Selected Papers Related to Long-Range Radio Navigation" presented at the Congress on Long-Range Navigation held in Munich, Germany, during 26–31 Aug. 1965 and reprinted by the Omega Implementation Committee for the United States Navy Department. U.S. patents classified, as indicated above, also deal with this subject matter, for example, U.S. Pat. Nos. 2,778,013, 2,855,595, 3,209,356, 3,263,231 and 3,388,397.

All receivers presently used in these navigation systems are known to have limitations affecting their use. They are bulky, and they are difficult to operate thereby necessitating the use of skilled, trained personnel. Additionally, the receivers are inaccurate and are not as reliable as they need to be in this application. They are expensive and are not suitable for semiautomatic or automatic operation, thus they are not suitable for use in modern, high-speed air and space craft.

SUMMARY OF THE INVENTION

It is, therefore, an object of the invention to provide an improved navigation system receiver.

An additional object is to provide a navigation system receiver capable of fixing the position of a craft with a high degree of accuracy.

Another object is to provide a more accurate navigation system receiver through the use of pulse-modulation techniques and circuitry.

Still another object is to provide a more accurate navigation system receiver through the use of pulse-quantizing techniques and circuitry for making phase-difference measurements.

A further object is to provide a navigation system receiver which has a high degree of selectivity and low noise.

A still further object is to provide a navigation system receiver having an improved means for displaying the position of the craft.

Another object is to provide means for displaying receiver information in a more reliable manner.

Still another object is to provide means for preserving the displayed navigation data in the event of a power failure.

A further object is to provide a navigational receiver which has a simplified design suitable for modular construction and ease of maintenance.

A still further object is to provide a navigational receiver which is characterized by the ease with which navigation is accomplished through the use thereof.

In the embodiment described, the invention is characterized by the use of pulse-signal or digital circuitry wherever possible, for intercircuitry signal-trains as well as output signals; the circuitry functions being defined in terms of pulse insertion and deletion, of pulse amplitude, duration and position modulation, of pulse quantizing, of pulse multiplexing and of counting and storing of information-carrying pulse trains. This characteristic concept is applied, directly, or indirectly, for its ultimate purpose, to various components of the navigational system, which comprises a local reference oscillator, a phase error detector, a selector for separate comparison of the several received time-shared signals with the local time reference, circuitry for matching the local phase with the phases of selected, received signals, and tracking apparatus for translating phase differences into terms of the hyperbolic grid.

More particularly, the aforesaid embodiment in a principal aspect of the invention involves primary phase equalization of local timing signals and incoming navigational signals by means of pulse insertion, controlled by pulses of opposite polarity which originate in a phase error-detector.

In another aspect, the signals coming from the several stationary transmitters are segregated at the receiver by commutator gates which are timed with the incoming signals by pulse insertion or deletion signals.

A further aspect deals with combined performance of the above-mentioned primary phase equalization as well as gate timing operations by means of pulse signals.

A fourth aspect is concerned with cumulative digital counting of the navigational data deducted from the Omega phase grid.

A fifth aspect involves lane position recording by means of pulse techniques.

In a sixth aspect, the above-mentioned cumulative counting is related to the principal aspect of phase equalization involving pulse insertion techniques.

In the seventh aspect of the above-mentioned lane position, recording is accomplished by pulse insertion techniques according to the principal aspect.

An additional aspect deals, in connection with the above features, with amplification by way of distributed filters.

BRIEF DESCRIPTION OF THE DRAWINGS

FIGS. 1 and 1a are schematic diagrams which, together with a tabulation contained in the description and referring to these figures, illustrate the general structure and operation of the present system in easily comprehensible fashion;

DESCRIPTION OF A PREFERRED EMBODIMENT

General Outline

Figure 1:
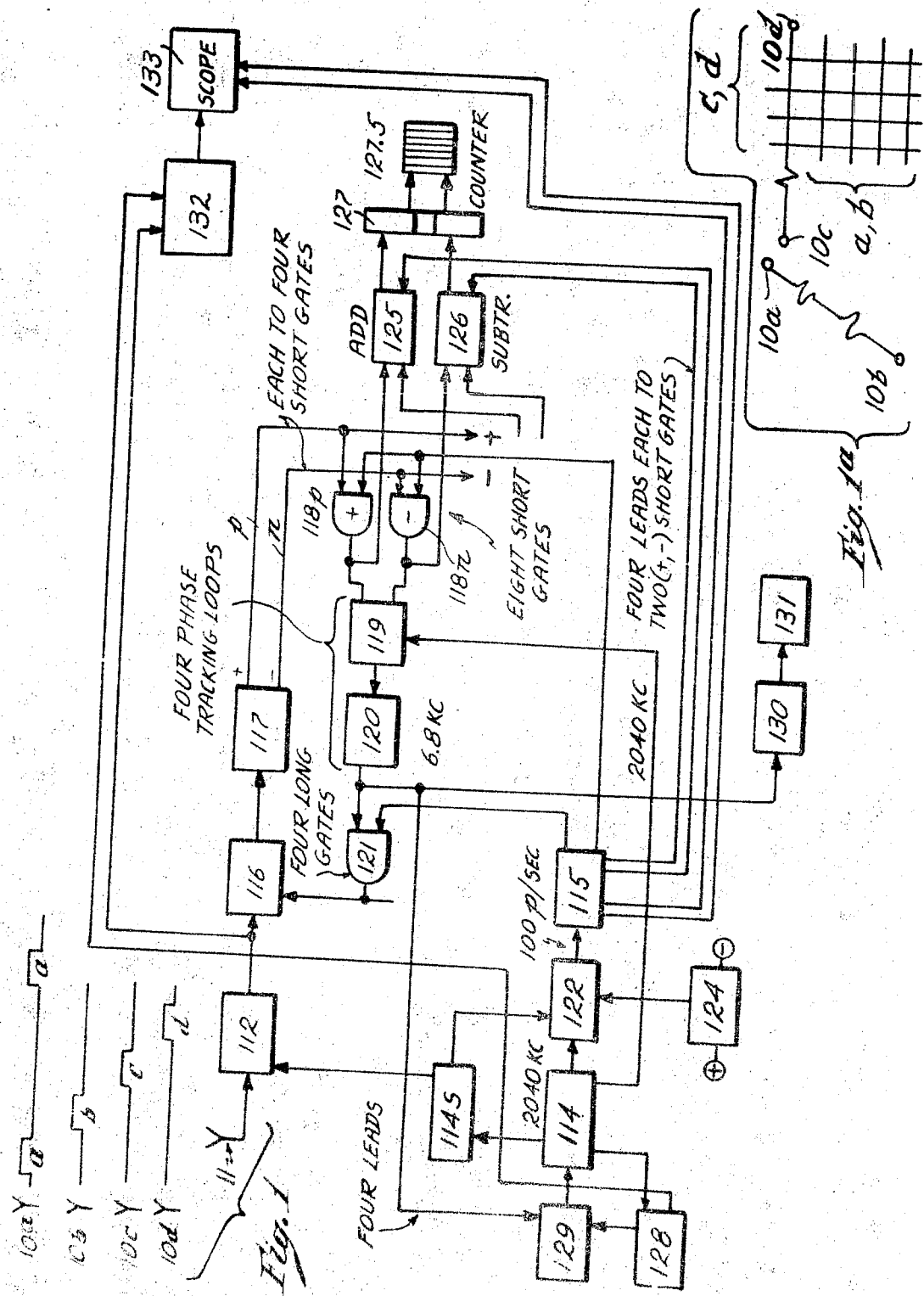

With reference to FIGS. 1 and 1a, an operational description of the system as a whole with some simplifications, will first be presented in the form of a tabulation which combines references to the function blocks of FIG. 1 with their operations correlation. The blocks are identified by identical numerals in both the tabulation and in FIGS. 1 and 1a.

As mentioned above, four transmitters, with their respective signals phase-synchronized, are assumed for purposes of the present description. The signals from the respective transmitters are indicated in FIG. 1 at 10a, 10b, 10c and 10d. As indicated, each transmitter transmits for a given period of time, a, b, c, d, and the transmitting periods of each transmitter is staggered with respect to all other transmitters. FIG. 1a schematically represents two hyperbolic lane systems established by transmitted signal pairs, such as a, b and c, d, respectively, and forming, when superimposed, a nearly rectilinear grid. While FIG. 1a shows the plotted signals from the four transmitters 10a, 10b, 10c, 10d and their hyperbola axes, it will be understood that the spatial relation of transmitters and grid is grossly distorted, as indicated by the broken axis lines. It should be noted that FIG. 1 and the tabulation set forth in the following material include only the components necessary to process the signal from one transmitter, although the number of components required for processing all the signals in a complete system, as described, is indicated by legend.

| Mark | Name | Input from | Operation | Output to |
|---|---|---|---|---|
| 110a 110b 110c | Plurality (here four) of transmitters | | Transmit synchronized VLF (10.2 KC) signals in timed sequence for corresponding receiver channels | 111 |
| 111 | Antenna and Coupler | 110 a,b,c,d | Receiving antenna for 10.2 KC signal, and coupling with amplifier | 112a |
| 112a | RF Amplifier | 111 | Distributed filter and limiter amplifier with optimal phase constancy | 112b |
| 112b | IF Amplifier | 112a 114s | Superheterodyne amplifier furnishing sinusoidal 6.8 KC signal | 116 |
| 114 | Reference Oscillator with Local | 129 | Generates stable pulse train, continuous at 2040 KC, for amplifier, timing function generator and adder subtractors. Feeds into local synthesizer 114s which supplies 17 KC signal after division by 120 | 123 112 114s 115 119 122 |
| 115 | Timing Function Generator | 122 | Generates commutation pattern for segregating timed sequence signals a, b, c, d in timed sequence. Pattern synchronized with patterns of a, b, c, d | 128 118n 118p 121 125 126 |
| 116 | Phase Error Detector | 112 121 | Compares signals a, b, c, d with local square waves from tracking synthesizers 20. Furnishes D.C. voltage going from −0.5 to +0.5 volts as phase error goes from −90° to +90° | 132 117 |
| 117 | Bilateral Pulse | 116 | Analog-digital converter of D.C. phase error signal into pulses at corresponding frequencies from zero pps for zero volt to 30 pps for 0.5 volt. Pulses corresponding to + and − volt on corresponding + and − output lines p and n | 118n 118p |
| 118p 118n | Short gates Four pairs | 115 117 | Segregate four tracking loops for the four signals a, b, c, d by way of timing signals | 119 125 |

| Mark | Name | Input from | Operation | Output to |
|---|---|---|---|---|
| 218n 218p etc. | (one per channel) | | from 115 and p and n signals from 117. Open slightly shorter than a, b, c, d sequences | 126 |
| 119 219 319 419 | Adder-Subtractors Four (one per channel) | 114 118p 118n | Combine p, n pulses from 17 and 118p, 118n with continuous pulse train 2040 KC from 114, inserting or canceling at 2040 KC pulse for each p, n pulse respectively | 120 |
| 120 220 320 420 | Tracking Synthesizers Four (one per channel) | 119 | Frequency dividers counting down by a factor of 300. Furnish 6.8 KC square waves with phases advanced 1/300 of a cycle for each pulse added and retarded 1/300 for each pulse deleted. Continuous 6.8 KC output signal. Once phase lock with 112 is established, 117 ceases to furnish p, n pulses. The pulses fed from 117 to 125, 126, measure the phase lead or lag of the signals from 10, quantized at 1/300 cycle | 121 129 130 |
| 121 | Four long Gates | 120 | Close the tracking servo loops 19, 20 back to 116. Driven by 118p, 118n from 115, synchronized with a, b, c, d. Open for full a, b, c, d | 116 |
| 122 | Sequential Channel Synchronizing Circuit | 114s 114 124 | Causes pulses from 124 to be added or deleted until coincidence is reached between gate pattern of 115 and a, b, c, d envelopes from 124 as observed at 133 when 124 is manually stopped | 115 |
| 124 | Pipe Generator | | Manually controlled, furnishes pulses to be added or subtracted at 122 | |
| 125 | Add Counter Stores | 118p 118r | Sum add pulses from 118p of one channel with subtract pulses from 218n of another channel. Feed into comparator and coil driver 127 | 122 127 |
| 126 | Subtract Counter Stores | 118p 118n | Sum subtract pulses from 118n of one channel with add pulses from 118p of another channel. Feed into coils 126.1 | 127 |
| 127 | Comparator-Coil Driver | 125 126 | Prevents counter from being driven in both directions simultaneously | 127.5 |
| 127.5 | Counters | 127 | Electromechanically record continuously the net difference provided by 127, this being the change of one centilane | OUTPUT |
| 128 | Synthesizer | 114 | Develops 6.8 KC for 129 | 129 |
| 129 | Loop Digital Phase Detector | 120 | Detects phase difference between 114 and one preferred (usually the strongest received) loop of 120 (one of a, b, c, d), to lock 114 to respective sender, in digital terms | 123 114 |
| 130 | Display Phase Detectors | 120 | Compare 6.8 KC output signals of pairs 19, 20. Furnish ramps from zero to maximum corresponding to phase differences from zero to full cycle | 131 |
| 131 | Chart Recorders | 130 | Graphically record the lanes crossings as lines traversing the chart relatively to a time base | OUTPUT |
| 132 | Envelope Detector | 112b 128 | Develops envelopes of a, b, c, d | 131 |
| 133 | Envelope Scope | 115 132 | Presents a, b, c, d envelopes and commutation pattern in dual trace against same time base to display synchronization | OUTPUT |

Figure 2:
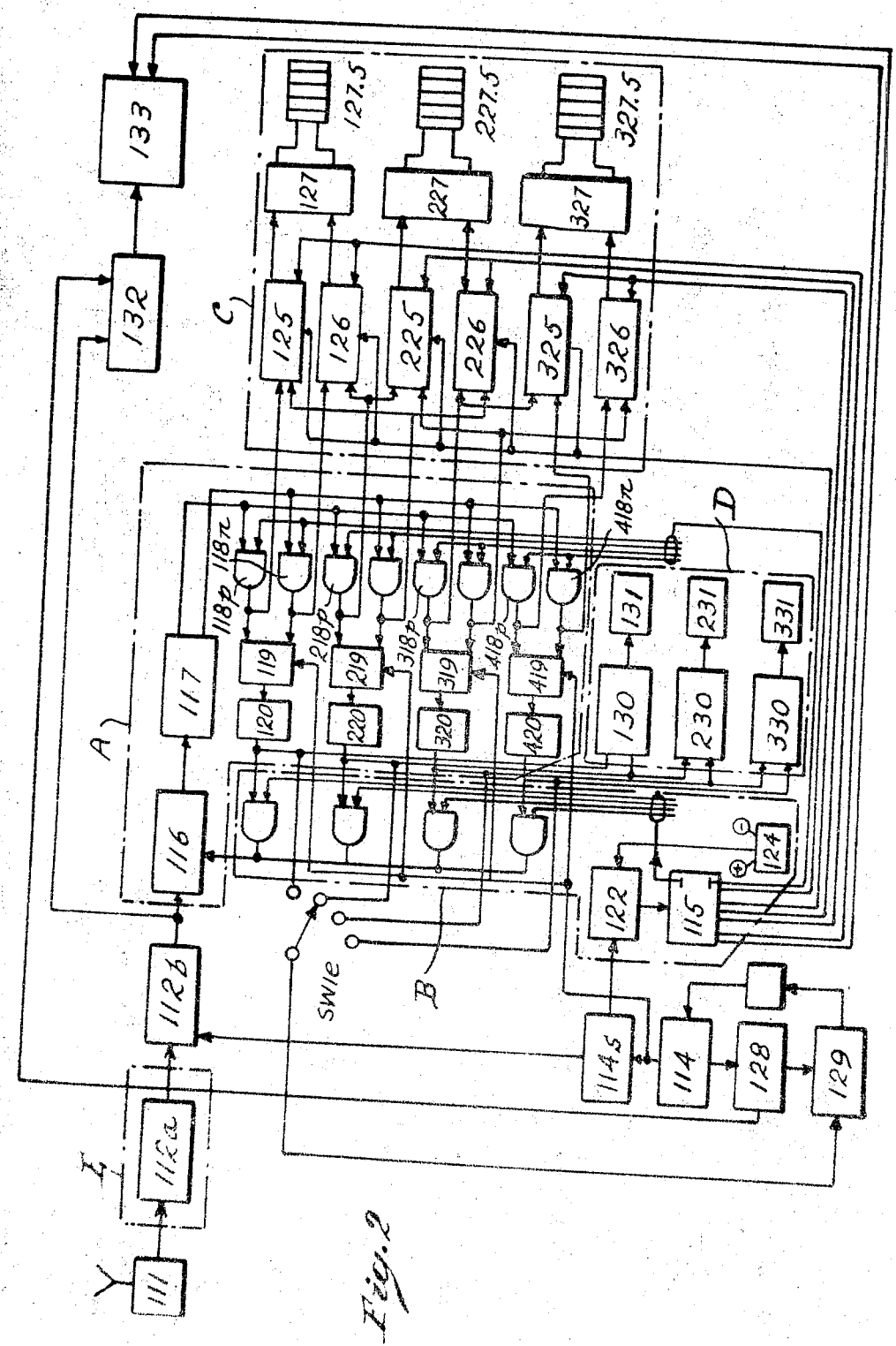
FIG. 2 is a simplified block diagram of the complete system emphasizing, as distinct from FIG. 1, circuitry lines rather than functional interrelation; the identifying numerals of the blocks correspond to those of FIG. 1; groups of blocks in dotted line frames which incorporate the above-characterized inventive aspects are marked with capital letters.

In order to facilitate a concise description of the embodiment and to correlate the same to the claimed structure, subdivision headings have been arranged to identify the previously mentioned "frames", marked with capital letters in FIG. 2. Respective blocks of the Schematic Drawings and frames are marked with numerals which correspondingly recur in all figures.

Where it is appropriate to the description, interconnections between the various components are marked with labels coded to indicate the blocks by their respective numerals and are further labeled by *i* for input and *o* for output, respectively, for example, *i* 112 is the input terminal from block 112, and *o* 112 is the output terminal to block 112.

A. Phase-Locked Loops

Figure 3:
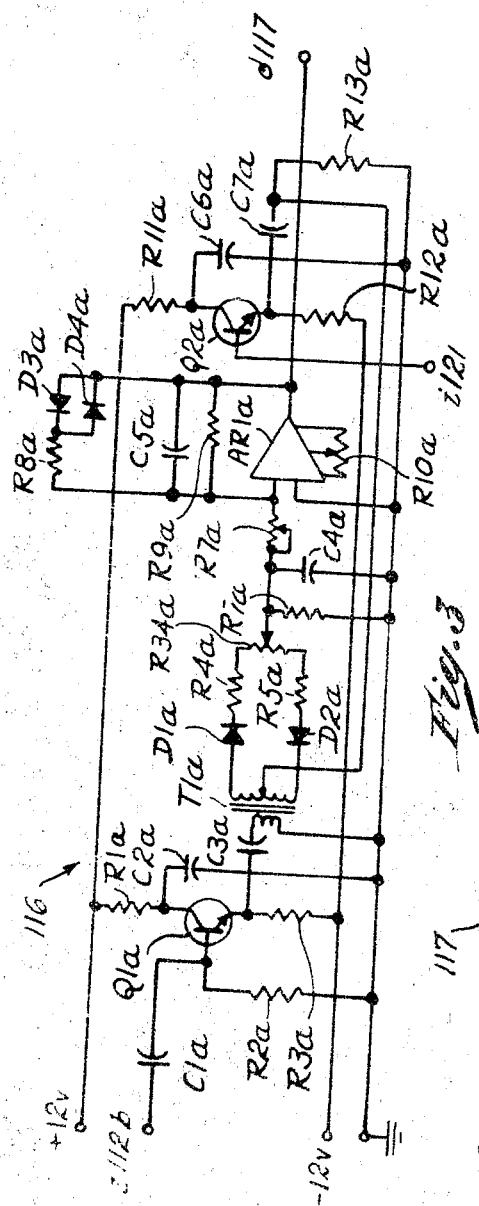
FIGS. 3, 4 and 5 are detailed circuit diagrams of the phase equalization group, within dotted line, frame A; the wiring of the detail circuitry of this group and of the other groups is completely evident from the respective figures, and their description is completed by a tabulation referring to the numbers marked on these figures and giving the names, ratings, or other identifications of the circuit elements.
Figure 4:
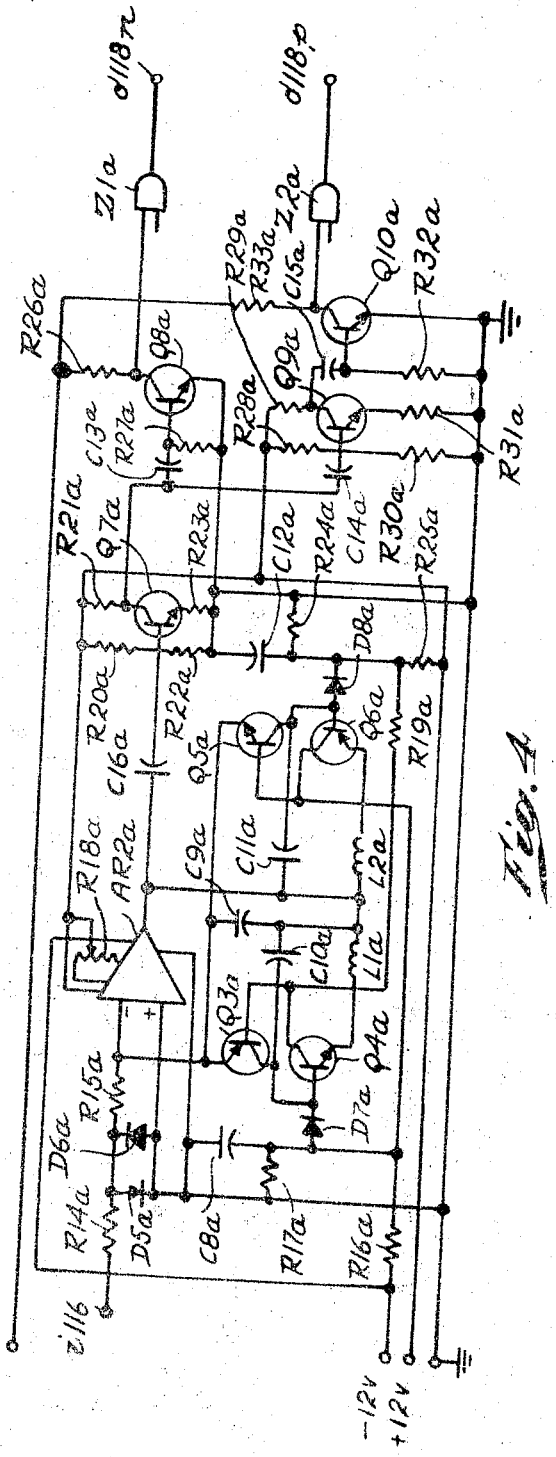
Figure 5:
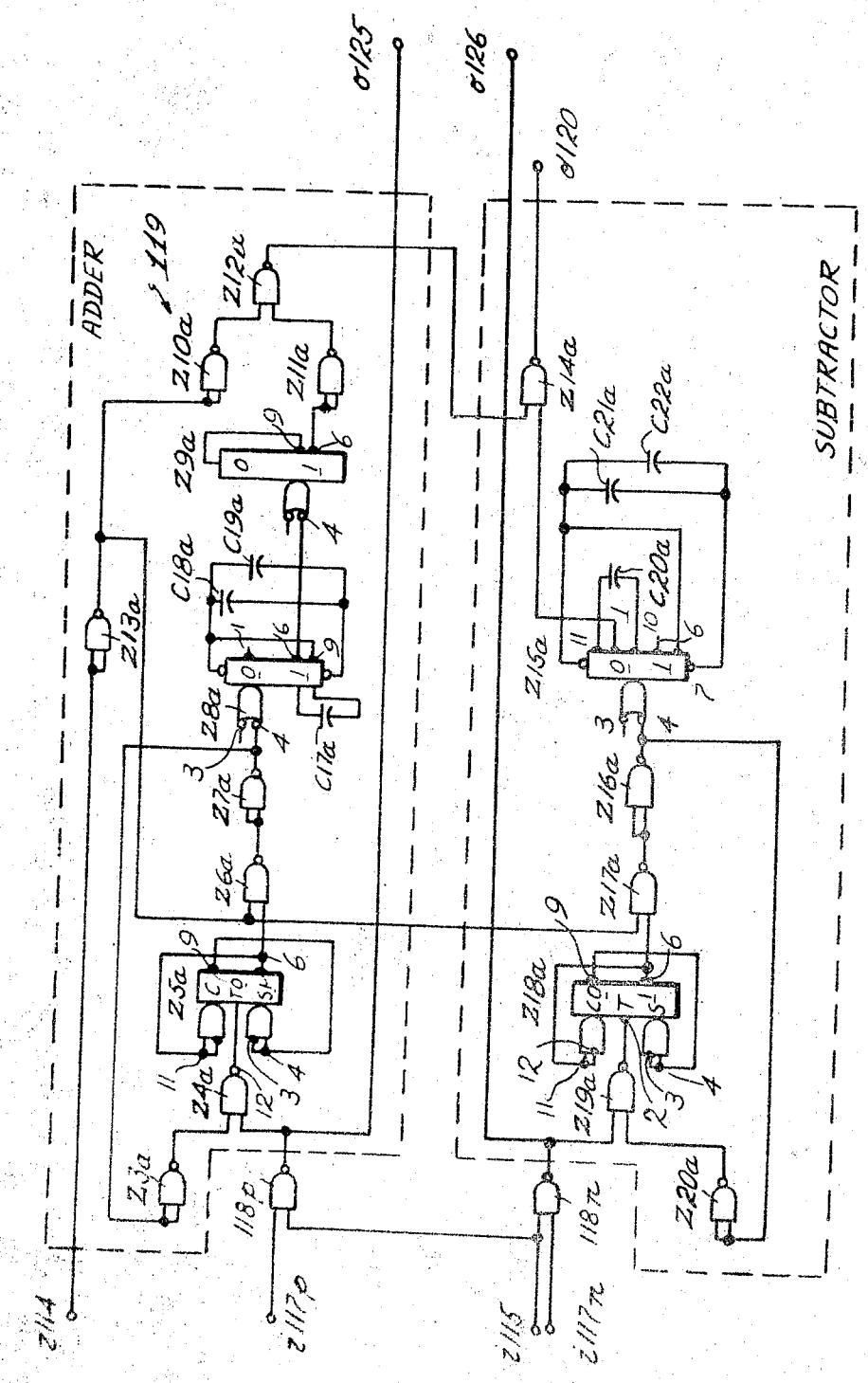

Referring to FIGS. 3, 4 and 5 which discloses a phase-locked loop, frame A, including blocks such as 116, 117, 119 and 120, and refer additionally to FIGS. 1 and 2 in order to correlate the description to the system operation. Each transmitted signal from stations 10a, 10b, 10c and 10d is tracked in a respective servo loop which is adapted to develop a continuous local signal which is phase-locked to the intermitten transmitted signal. For instance, a single reference oscillator 114 (FIG. 2) provides a local, precision, phase signal for all servo loops. Each respective loop includes a common, phase-error detector 116 which compares the signal from mixer 112b with a corrected, local signal derived from reference oscillator 114. The phase-error detector 116 has a DC output which is positive, negative, or zero depending on the phase difference between the compared signals. This DC output is fed to and controls a bilateral pulse generator 117 which is common to each loop but has two output lines, one line carrying pulses corresponding to a positive phase difference, the other line carrying pulses corresponding to a negative phase difference. The two output lines are coupled through commutating gates, to be fully described under B, 118p, 118n, 218p, 218n, . . . 418p, 418n, sequentially to each one of four local slave channels including, respectively, an adder-subtractor 119, 219, 319, 419 and a divider 120, 220, 320, 420. The function of each adder-subtractor, such as 119, is to adjust the 2,040 KC reference oscillator signal, from 114, by either adding a pulse for each positive pulse from generator 117, or deleting a pulse for each negative pulse from generator 117. The following dividers 120, 120, 320, 420 convert the adjusted 2,040 KC signal to the 6.8 KC signal which is to be compared in phase-error detector 116. Each pulse addition in adder-subtractor 119 changes the phase of the 2,040 KC signal by 360°. After division by a factor of 300 by divider 120, the net effect on the 6.8 KC comparison signal is to make a phase change of 1.2° or 1/300 cycle therein.

As the receiver is moved with relation to the transmitting stations, the phase of the received signal changes, and the phase of the local comparison signal must be changed to maintain coincidence. The pulses which correct the phase of the local comparison signal serve as a measure of change of phase, and therefore of receiver change of position with respect to the respective transmitting stations. By properly comparing the number of positive and negative pulses produced in phase tracking a pair of transmitting stations, as will be hereinafter explained with reference to frame C, it is possible to determine where the receiver lies within the lanes and centilanes (FIG. 1a) which are characteristic of the Omega navigation system.

1. Phase-Error Detector 116 (FIG. 3)

Phase-error detector 116 compares the 6.8 KC input signal, derived in mixer 112b from the transmitting station 102 KC signals a, b, c, d, with the corrected 6.8 KC comparison signal from the appropriate local channel, as follows. Transistor Q1a constitutes an emitter follower amplifier for the signal received at input i 112b. This signal is fed through the two diodes D1a and D2a, connected in push-pull arrangement, through balanced transformer T1a and capacitor C3a. Transistor Q2a constitutes an emitter follower amplifier for the reference signal from terminal i 121, which is fed as a single-ended signal into both diodes D1a and D2a through the transformer center-tap. The diodes D1a and D2a act as gates controlled by the reference signal, and operate to pass alternate sections of the 6.8 KC input signal. Since each tracking loop or channel is gated to correct phase every time its associated transmitter signal is received (approximately once every 10 seconds in conventional Omega practice), the phase detector 116 will make small corrections and operate near zero output.

The signal passed by diodes D1a and D2a is integrated by capacitor C4a to remove high-frequency AC components, and is then fed to an operational integrater including amplifier AR1a having feedback components R9a, C5a, R8a. The operational integrater reduces the high frequency components of the phase-error signal and provides sufficient DC gain to negate the effects of offsets caused by drift which is associated with a bilateral pulse generator of the type described below.

The servo loop gain is determined by the DC gain of the phase-error detector and the time constant of the bilateral pulse generator. This design provides a noise-free, phase-tracking velocity of approximately 3.6 microseconds per second or a bandwidth in this instance of .036 cycles, approximately. The performance of this noise-free bandwidth, examined in an input signal to noise ratio of 1/10 in a 100 Hz bandwidth, yields a 5 microsecond lag-angle of a baseline velocity of 35 knots, which is deemed adequate for current vehicle movement requirements. The output of the phase-error detector 116 is a DC voltage which is either positive, negative or zero, and of variable magnitude, depending on the phase relationship of the compared signals. The DC signal appears at terminal o 117.

2. Bilateral Pulse-Generator 117 (FIG. 4)

The DC output voltage from the phase-error detector 116 is converted into a series of pulses whose frequency depends on the magnitude of the DC voltage. Depending on the polarity of the DC voltage, the pulses are segregated to output terminal o 118n (negative polarity) or output terminal o 118p (positive polarity).

The DC input from terminal i 116 is integrated by operational amplifier AR2a to produce a signal ramp which will be either positive or negative, depending on the polarity of the voltage. The steepness of the ramp is determined by the magnitude of the voltage. Across integrating amplifier AR2a are connected two pairs of complementary transistors Q3a–Q4a and Q5a–Q6a connected regeneratively to form an artificial four-layer diode. When the voltage across either pair reaches the breakdown voltage, the pair conducts, discharging the integrating capacitor C9a. As a result, a positive or negative saw-tooth wave, whose polarity and frequency depend on the input voltage, is produced at the output of operational amplifier AR2a. The saw-tooth wave is differentiated by capacitor C16a to produce a series of positive or negative pulses. These pulses are amplified through transistor Q7a, and segregated by the pulse separator formed by transistors Q8a and Q9a. Transistor Q8a is biased to be sensitive only to the positive pulses which thus appear as positive pulses at output terminal o 118n. Transistor Q9a is biased to be sensitive only to negative pulses which are then inverted by transistor Q10a to appear as positive pulses at output terminal o 118p. The frequency of the pulses depends on the input voltage magnitude, which is dependent on the magnitude of the phase difference between compared signals. The pulse frequency, in the examples shown, is on the order of 0 to 60 cycles per second.

3. Input or Short Gates 118p, 118n (FIG. 5)

As shown in FIG. 2, the phase-error detector 116 and the bilateral pulse generator 117 serve all of the local tracking-channels, being connected sequentially to the channels by input gates 118p and 118n, etc. and output gates 121, etc. The input gates 118p, 118n are shown in FIG. 5. They are simultaneously gated by a signal at i 115 to pass pulses from the bilateral pulse generator 117 to the adder-subtractor 119 and to the add and subtract counter storage 125 and 126. Besides the shared detector 116 and generator 117, each local tracking channel has connected to the reference oscillator 114 its own separate adder-subtractor 119, 219, etc. and tracking synthesizer 120, 220, etc., a construction of which is described in detail below for a single channel, the other channels having identical components.

4. Adder-subtractor 119 (FIG. 5)

The adder-subtractor 119 uses the pulses produced by bilateral pulse generator 117 to adjust the phase of the local 6.8 KC reference signal which is compared to the incoming signal in phase-error detector 116. The adder-subtractor 119, accordingly, has inputs from the bilateral pulse generator 117 (through gates 118p, 118n), and it moreover has an input $i$ 114 from the 2,040 KC local reference oscillator 114. The output at terminal $o$ 120 is a 2,040 KC signal with pulse additions corresponding in number to pulses at the input $i$ 118p, and pulse deletions corresponding in number to pulses at input $i$ 118n. This modified 2,040 KC signal is then divided downwardly by a factor of 300 in the tracking synthesizer 120 to produce a phase-corrected 6.8 KC signal suitable for comparison in the phase-error detector 116.

The operation of the adder-subtractor 119 is as follows. For simplicity, the add and subtract functions will be taken separately. An add pulse through gate 118p triggers an Eccles-Jordan flip-flop Z5a, which opens gate Z6a. The opening of gate Z6a permits the negative-going portion of the 2,040 KC signal to trigger monostable multivibrator Z8a to produce a 100 nanosecond delay. At the conclusion of this 100 nanosecond delay, monostable multivibrator Z9a is triggered and produces a second 100 nanosecond delay pulse which is additively combined with the 2,040 KC signal in gate Z12a, the 2,040 KC signal with inserted pulse then passing through gate Z14a to output terminals $o$ 120. The signal which starts the first multivibrator Z8a, also resets flip-flop Z5a through gate Z4a, to return the components to starting condition so that a second add pulse will produce the same result.

Subtract pulses through gate 118n trigger a separate flip-flop Z18a which opens gate Z17a to permit the 2,040 KC signal to trigger monostable multivibrator 15a. Monostable multivibrator Z15a has a period of approximately 600 nanoseconds, which is slightly greater than the length of a single 2,040 KC cycle. This 600 nanoseconds pulse is then used to inhibit gate Z14a to interrupt the 2,040 KC pulse train for this length of time, thereby eliminating one pulse. The pulse train, with deletion, appears at output $o$ 120. The pulse which triggers multivibrators Z15a also resets flip-flop Z18a through gate Z19a so that original conditions are again established and the process can repeat.

The signal at output terminal $o$ 120 is thus a 2,040 KC signal which has its phase advanced 360° for each pulse at input $i$ 118p, and retarded 360° for each pulse at input $i$ 118n.

5. Tracking Synthesizer 120 (FIGS. 1, 2)

Tracking synthesizer 120 counts down, or divides, the 2,040 KC phase-adjusted signal appearing at terminal $o$ 120 of the adder-subtractor 119, by a factor of 300. The resulting signal is the local 6.8 KC comparison signal which has its phase advanced or retarded 1.2° for each pulse generated by the bilateral pulse generator 117 and inserted or deleted from the 2,040 KC reference signal in adder-subtractor 119. This phase corrected 6.8 KC tracking signal is then commutated through gate 121 to be compared in phase-error detector 116 with the received signal from the station transmitting at the time. During the time that a local tracking channel is gated into the phase detecting circuit, errors of phase coincidence are being corrected by the servo mechanism which has been described. Because of the discrete nature of the phase correction signal, the reference 6.8 KC signal moves back and forth across the zero-error position by steps of 1.2°, with the result that the actual RMS error is less by a factor of 2. During the time that a tracking channel is gated out of circuit with the received signal (9 out of every 10 seconds in ordinary Omega practice), the 6.8 KC comparison signal continues at the phase last established. The pulses produced by the bilateral pulse generator 117 are then interpreted as incremental changes of position of the receiver with respect to any one transmitter. By combining pulses from two tracking channels, it is possible to interpret the pulses as changes of position within the hyperbolic lanes of phase coincidence between the signals of the two transmitters so tracked. Since 300 pulses of one sense (+ or −) would result in complete phase change of one cycle of the local 6.8 tracking signal, it follows that each single pulse represents 1/300 of a lane.

The numerals 1 to 20 in FIGS. 3 to 5 represent in conventional manner the terminal numbers of the respective integrated circuit devices to which they are applied. The numerals 0 and 1 within the flip-flop symbols indicate the output states in conventional manner.

The nature and electrical connections of the elements of each of the circuit components contained in frame A (with the exception of the conventional counter at 120) are clearly shown in FIGS. 3 to 5.

B. Commutator Circuitry

Selection of the appropriate channel (119, 120 to 419, 420) is carried out by means of eight input gates 118p, 118n to 418p, 418n and four output gates 121 to 421 in response to a gating pattern signal generated by timing function generator 115. Generator 115 produces a gate pattern which is synchronized with the incoming Omega envelope pattern by slewing circuitry comprising a manually controlled pulse generator 124 which, by manual selection, provides pulses to be added or subtracted in a synchronizing circuit 122. The synchronizing circuit 122 operates similarly to the adder-subtractor 119 to advance or retard the phase of a clock signal derived from the local reference oscillator 114. The clock signal, with its phase advanced or retarded for synchronization, operates shift registers in the timing function generator 115, which in turn controls the opening and closing of input gates 118p, 118n to 418p, 418n (illustrated in FIG. 5) and output gates 121 to 421 (illustrated in FIG. 6).

In addition to providing a gating signal to commutate the local tracking channels, the timing function generator 115 provides a clock with 10 pps and a sequential, resetting signal for the add-and-substract counter storage 125, 126, which will be explained in greater detail with reference to frame C.

Figure 7:
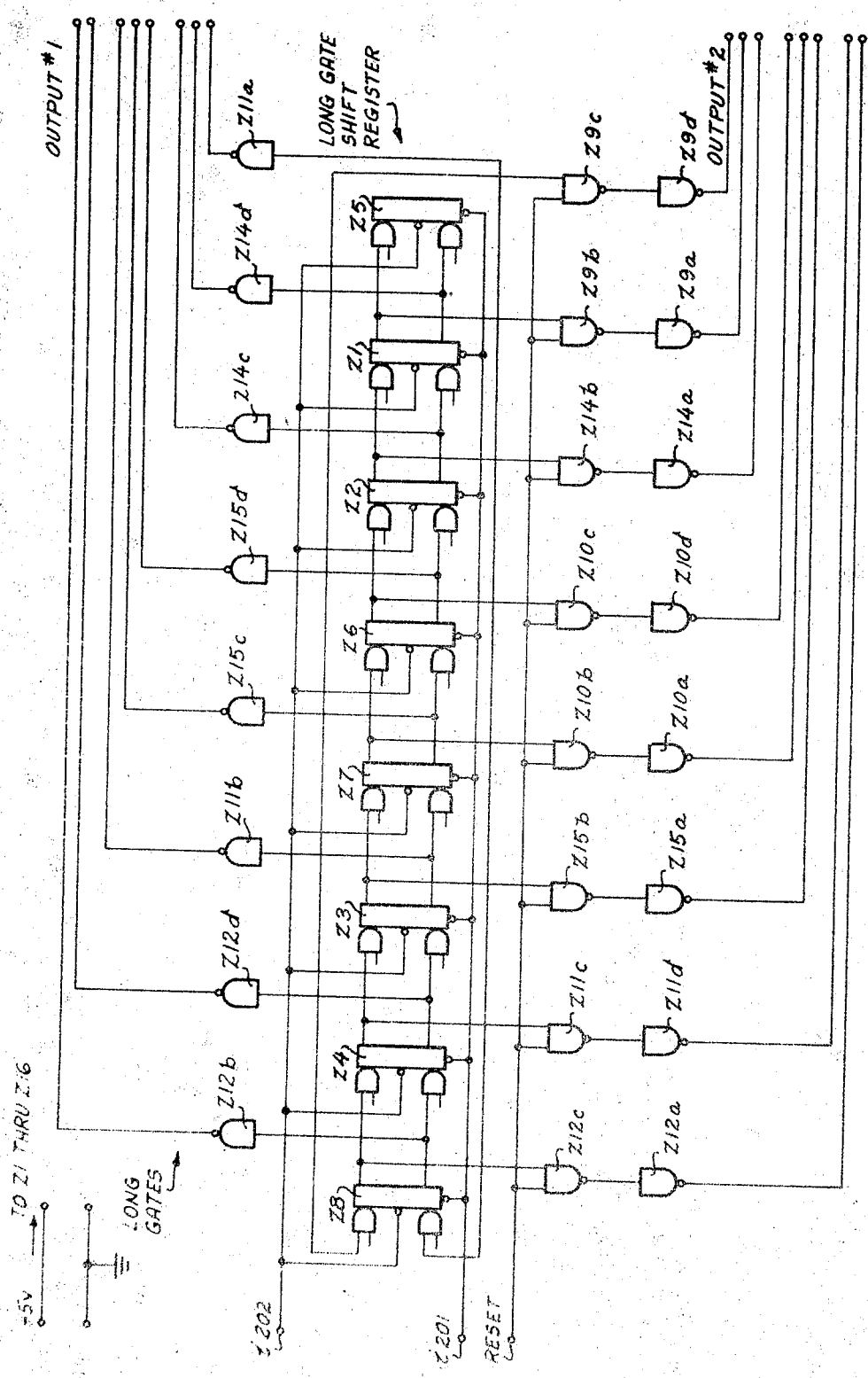

1. Timing Function Generator (FIG. 7)

Figure 6:
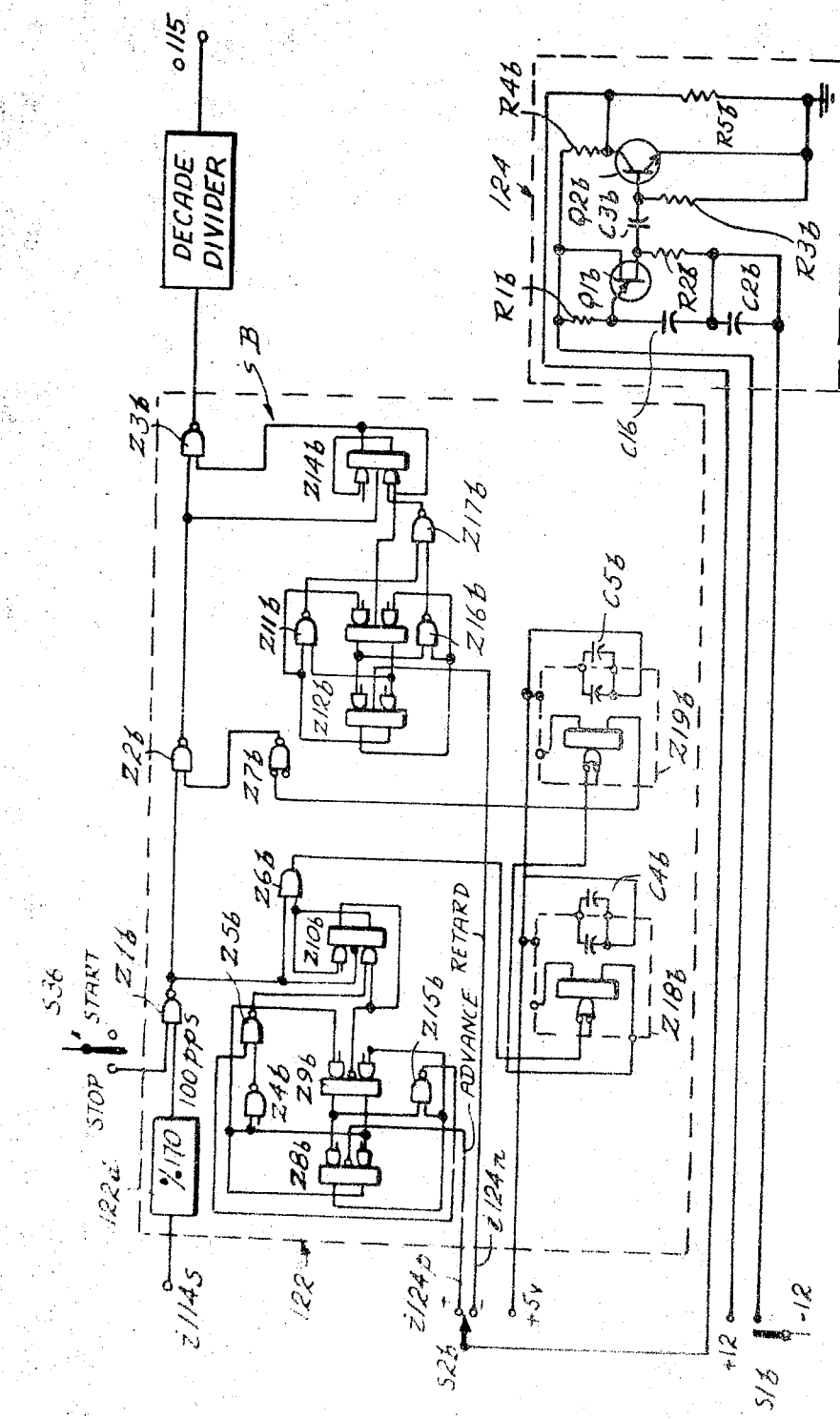
FIGS. 6, 6A, 6B and 7 are detailed circuit diagrams of the signal segregation group, frame B.

The timing function generator consists of a decade divider (FIG. 6) which provides a ten pulse-per-second signal, slewable in real time as described in the material that follows, a counter and decoder (FIG. 6a) operating at a 10 Hz rate, and a shift register (FIG. 7) which provides long and short gates used to open and close gates 119p, 118n to 418p, 418n (FIG. 5) and output gates 121 to 421 (FIG. 6).

Figure 6A:
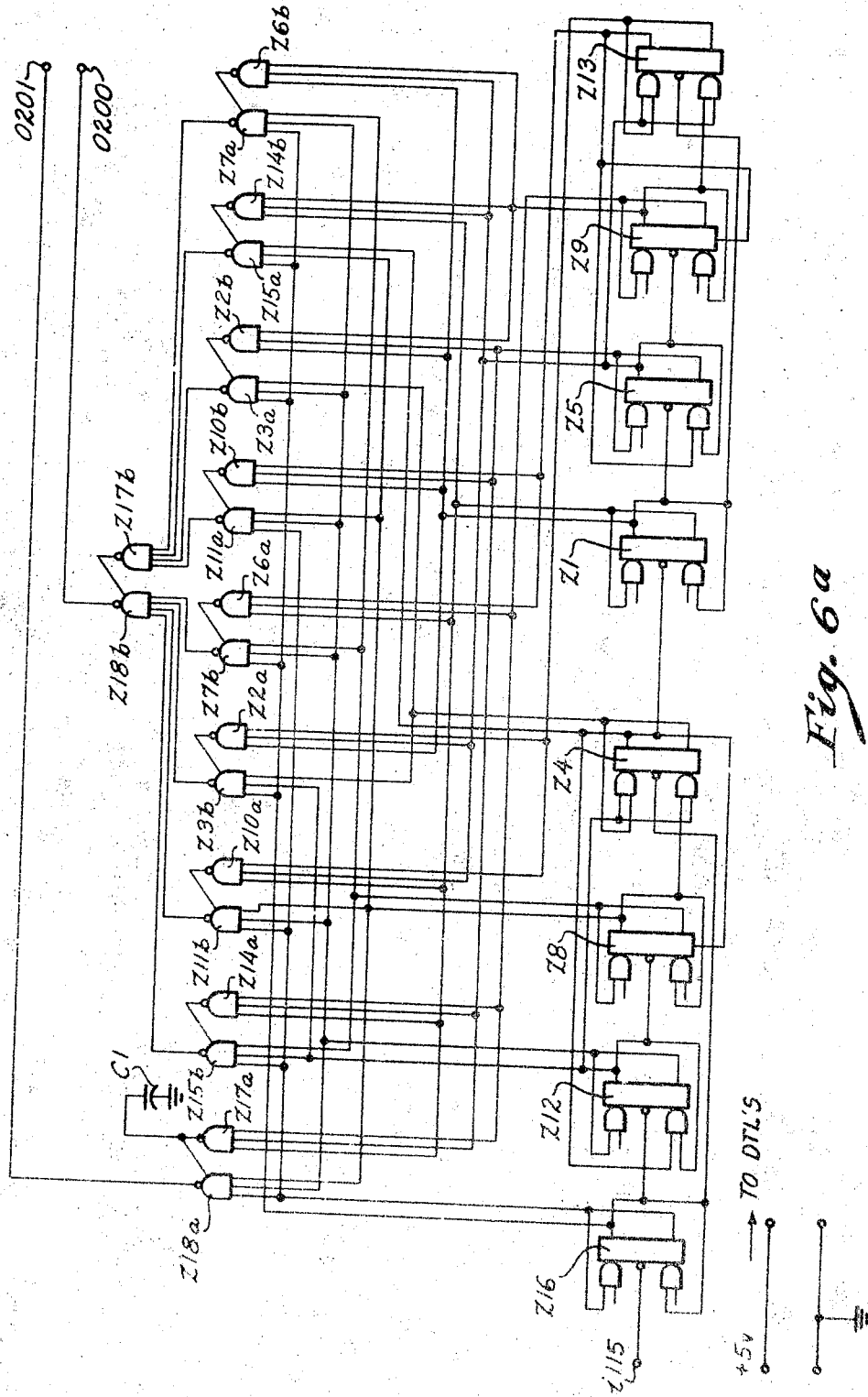

Pulses from the decade divider (FIG. 6) are fed at a 10 Hz rate to $i$ 115 of FIG. 6a, the basic time counter and decoder. Z16, Z12, Z8 and Z4 are binaries connected for a 10 count. The output of Z4 drives Z1, Z5, Z9, and Z13 which constitute a second, similarly connected counter. Selected outputs from the binary stages are combined in gates Z18 and Z17a to generate a "zero" pulse corresponding to the initiation of the internally generated Omega timing cycle, i.e. one pulse is generated for each 10 second interval.

The binary outputs are also combined thru several gates and collected in Z18 to generate eight pulses during the 10 second interval, each one occuring at a time corresponding to the end of the short gate interval. These pulses at 0200 (FIG. 6a) are fed to the sampling counter and decoder (FIG. 6b) to $i$ 200. The output of Z3d sets binary Z6 to enable gate Z10c. Z10c and Z10b pass the 10 Hz pulse train which appears at $i$ 115 into Z4, Z8 and Z12, a three-stage binary counter. These stages count at a 10 Hz rate until a digital "six" is generated in Z3b which puts out a pulse actuating Z1, a one shot multivibrator whose output resets binaries Z4, Z8 and Z12 to the zero state and in addition resets Z6, thereby inhibiting Z10c and stopping the 10 Hz input until the next pulse occurs at $i$ 115. Outputs from the binary counters are combined in Z7a and Z3a for a digital number corresponding to a "one" and a "five" respectively which set and reset binary Z2. The output of binary Z2 corresponds timewise to the short gate signals previously mentioned.

Figure 6B:
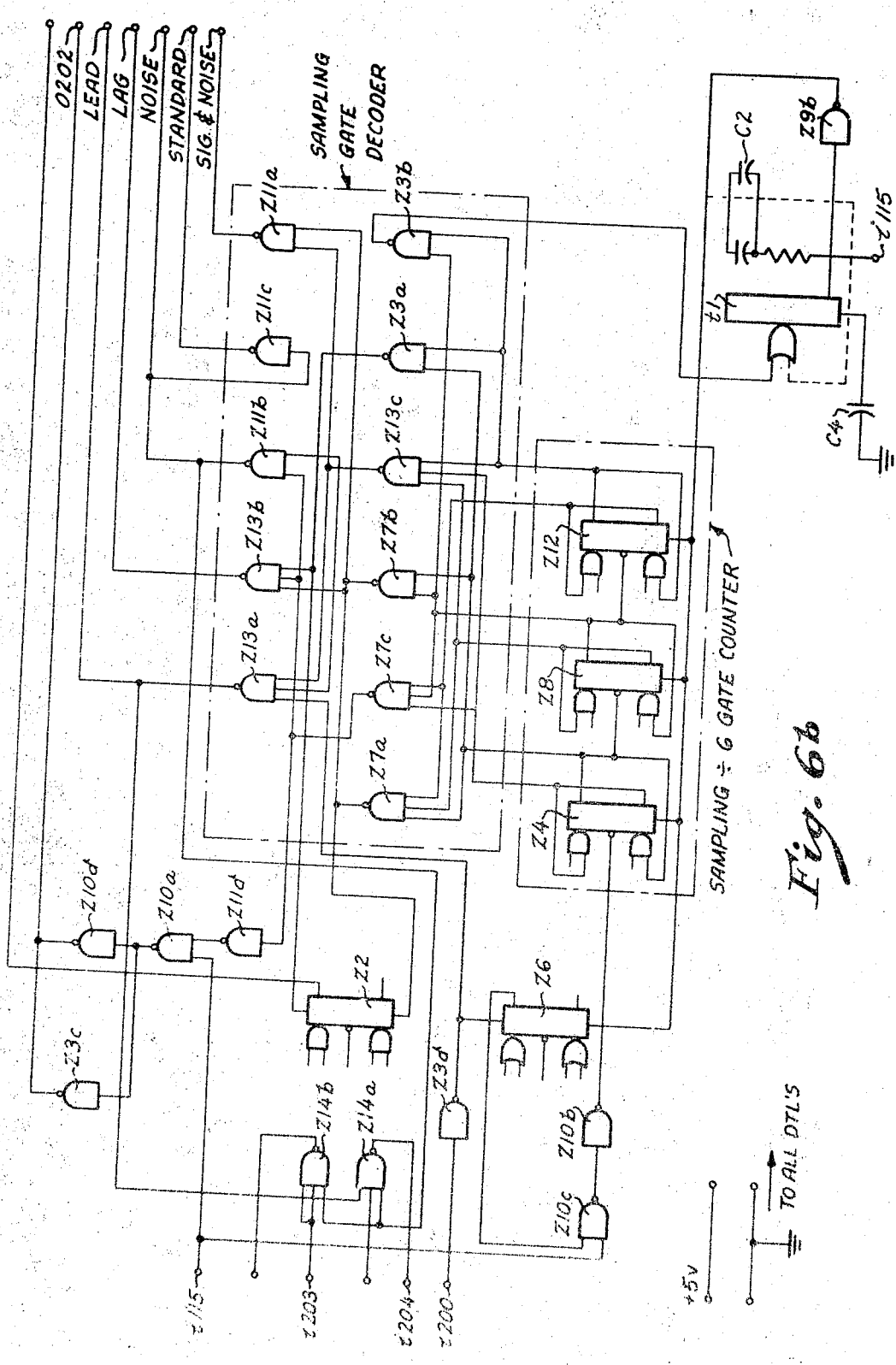

Outputs from the binary counters are further combined in Z7c for a binary number "three". This three is combined with the 10 Hz clock in Z10a to provide a synchronous pulse at the exact time to initiate the long gates previously mentioned. This pulse line is fed out through Z10d to connection 0202 to the long-gate shift register (FIG. 6b). Other digital numbers are decoded in Z13a, Z13b, Z11b, Z11c and Z11a. Two of these are combined with long gates from the long gate shift register fed in on Z14b, pin $i$ 203 and Z14a, pin $i$ 204 to generate discrete pulses between the third and fourth Omega transmission segments which are used along with the Zero pulse previously mentioned to initiate count out operation in 125 & 126, 225 & 226, and 325 and 326 of FIG. 2 at discrete intervals during the 10 second timing cycle.

A reset pulse corresponding to the zero pulse generated in the basic time counter and decoder feeds the long gate shift register (FIG. 6b) and resets the shift register comprising Z8, Z4, Z3, Z7, Z6, Z2, Z1, and Z5, once every 10 second interval. The drive pulse, corresponding to the binary 3 described in the sampling counter and decoder shifts the register one stage for each input, thereby generating a pulse on each of the eight buffered output lines provided by Z12b, Z12d, Z11b, Z15c, Z15d, Z14c, Z14d and Z11a in proper time sequence. These pulses are the long gates referred to earlier.

The output of each stage of the shift register is in addition fed to gates Z12c, Z11c, Z15b, Z10b, Z10c, Z14b, Z9b, and Z9c. During each long gate signal, these gates are enabled and act to separate the short gate signals heretofore developed on one line as described in the sampling counter and decoder and to provide separate short gate outputs as required to operate gates 121 to 421 (FIG. 6).

2. Pulse Generator 124 (FIG. 6)

Pulse generator 124 is a conventional relaxation oscillator employing a unijunction transistor Q1b. The pulse generator 124 operates only when switch S1b is closed manually to bias the circuit into oscillation.

By means of switch S2b, the output of pulse generator 124 can be connected either to time-advancing input $i$ 124p or to time-retarding input $i$ 124n of the synchronizing circuit 124.

3. Synchronizing Circuit 122 (FIG. 6)

Synchronizing circuit 122 has an input 1 114s which accepts a 17 KC reference signal derived from the local oscillator 114. This 17 KC signal is divided by 170 in divider 122d to produce a pulse train of 100 pps which, as modified in a manner now to be explained, appears at output terminal $o$ 115 to run the shift registers in the timing function generator 115. The 100 pps pulse train and the resulting gate pattern is "slowed down" or "hurried up" by the addition or deletion of pulses from pulse generator 124 which pulses are manually selected to be applied either to the time advancing input $i$ 124p or the time-retarding input $i$ 124n. A pulse appearing at input $i$ 124p is treated as follows:

A pulse appearing at 124p sets flip-flops Z8b enabling flip-flop Z10b thru gates which are enabled by either Z4b or Z15b. The next 100 pps signal occurring at the output of Z1b operates to set flip-flop Z10b. The output of Z10b enables gate Z6b to pass one 100 pps-pulse to initiate two delay one-shot multiocrotors Z18b and Z19b. The output of Z19b is delayed by Z18b until approximately midway between the first and second sequential 100 pps outputs from Z1b at which time it generates a narrow pulse which is inserted in the 100 pps train by action of gate Z2b.

The change in state of flip-flop Z10b is led to set flip-flop 29b which inhibits gate Z5b through gates 24b or Z15b. The second sequential 100 pps output from A1b resets Z10b to its original state inhibiting gate Z6b and returning the circuit to rest until the next pulse on line $c$ 124p changes the state of flip-flop Z8b.

Similarly, a pulse appearing at the retard input $i$ 124n is treated as follows:

A pulse appearing at 124n sets flip-flop Z12b, thus enabling flip-flop Z14b thru gates Z176, which is in turn enabled by either gate Z11b or Z16b. The next following 100 pps at the output of Z2b sets flip-flop Z14b, thereby inhibiting gate Z3b, and changing the state of Z20b to inhibit gate Z176 thru either gate Z116 or gate Z16b. The second sequential 100 pps pulse at the output of Z2b resets Z116 which enables gate Z3b and the circuit is at rest condition, having deleted one pulse in the 100 pps train appearing at the output of gate Z3b.

Correspondence between the station transmission envelope pattern ($a, b, c, d$ of FIG. 1) and the gate pattern of timing function generator 115 is achieved by the foregoing synchronization circuit. This circuit essentially serves to phase shift the 10-second cycle of the timing function generator's gating pattern, relative to the time base established by the reference oscillator 114. This is accomplished by inserting extra pulses in, or deleting some of the normal pulses from, the 100 pps train derived from the reference oscillator 114. Since the reference oscillator 114 is phase-locked to one of the received Omega signals (see description of frame E below), the gating pattern can be made to coincide, within 1/100 of a second, to the Omega signal pattern as received.

Synchronism can be observed and verified with oscilloscope 133 (FIG. 2). The oscilloscope 133 provides a dual trace for comparison purposes, i.e., one trace being provided by the envelope of the received Omega signal (developed in envelope detector 132) and the other trace being provided by the gate pattern of the timing function generator 115, which also provides the sweep. By comparing the two traces visual observation of synchronism is possible. Other means for observing and verifying synchronization are available: For example, a pair of lights energized respectively by the gating pattern and by the received Omega signal envelope will show synchronization. Or, by way of another example, a meter comparing one channel's envelope with the gate pattern therefor will show synchronism.

A stop-start switch S3$b$ permits the clock pulse-train, fed to timing function generator 115, to be interrupted. When on "stop", the switch also resets at input $i$ S3$b$ (FIG. 7) the shift registers to zero in the timing function generator. Thus, switching switch S3$b$, set to "start", will initiate the gate sequence on the next clock pulse.

C. Digital Position Display

The pulses which are inserted or deleted to correct phase in the local tracking channels provide the information used by the circuitry of frame C for a numberical readout of position in terms of lanes and centilanes. These pulses are stored in a counter-register as they are generated, and then periodically transferred to the electro-mechanical counters 127.5, 227.5 or 327.5. Each electro-mechanical counter is adapted to display decimally the position of the receiver, expressed in lanes and centilanes, in relation to a pair of transmitting stations. Usual Omega practice assigns a number to each of the hyperbolic lines of phase coincidence between a pair of transmitting stations and identifies the interline regions as lanes. A centilane is, accordingly, a distance equal to one hundredth of the distance between the two lines which the receiver identifies. After the lane and the centilane count is initially set into one of the electro-mechanical counters, such as 127.5, a change of position of the receiver, producing phase-corrective pulses in generator 117, is indicated in the following manner. For simplicity, there will be described only the circuitry necessary for handling two transmitting stations, such as 10$a$, 10$b$ (FIGS. 1, 1$a$) which comprises counter-storage 125 and 126, comparator and driver 127, and electro-mechanical counter 127.5. Circuitry identical to that of 127.5 is associated with counters 227.5 and 327.5, which may, for example, display position with respect to transmitting stations 10$b$, 10$c$ and 10$c$, 10$d$, respectively.

Operation of the circuitry blocks 125, 126 and 127 is more easily understood by first considering the arithmetic operations to be performed therein. Briefly, block 125 adds pulses representing positive phase changes in one channel to pulses representing negative phase changes in a second channel. Block 126 adds pulses representing negative phase change in the one channel to pulses representing positive phase change in the second channel. The pulse total of block 125 is applied to the electro-mechanical counter 127.5 in a sense opposite to the pulse total from block 126 to obtain the difference between the two numbers of total pulses. This difference represents, in pulse terms normalized to centilanes, the net change of phase at the receiver of the one channel's transmitting station with respect to the second chanel's transmitting station.

1. Counter-storage 125 (FIG. 8)

Figure 8:
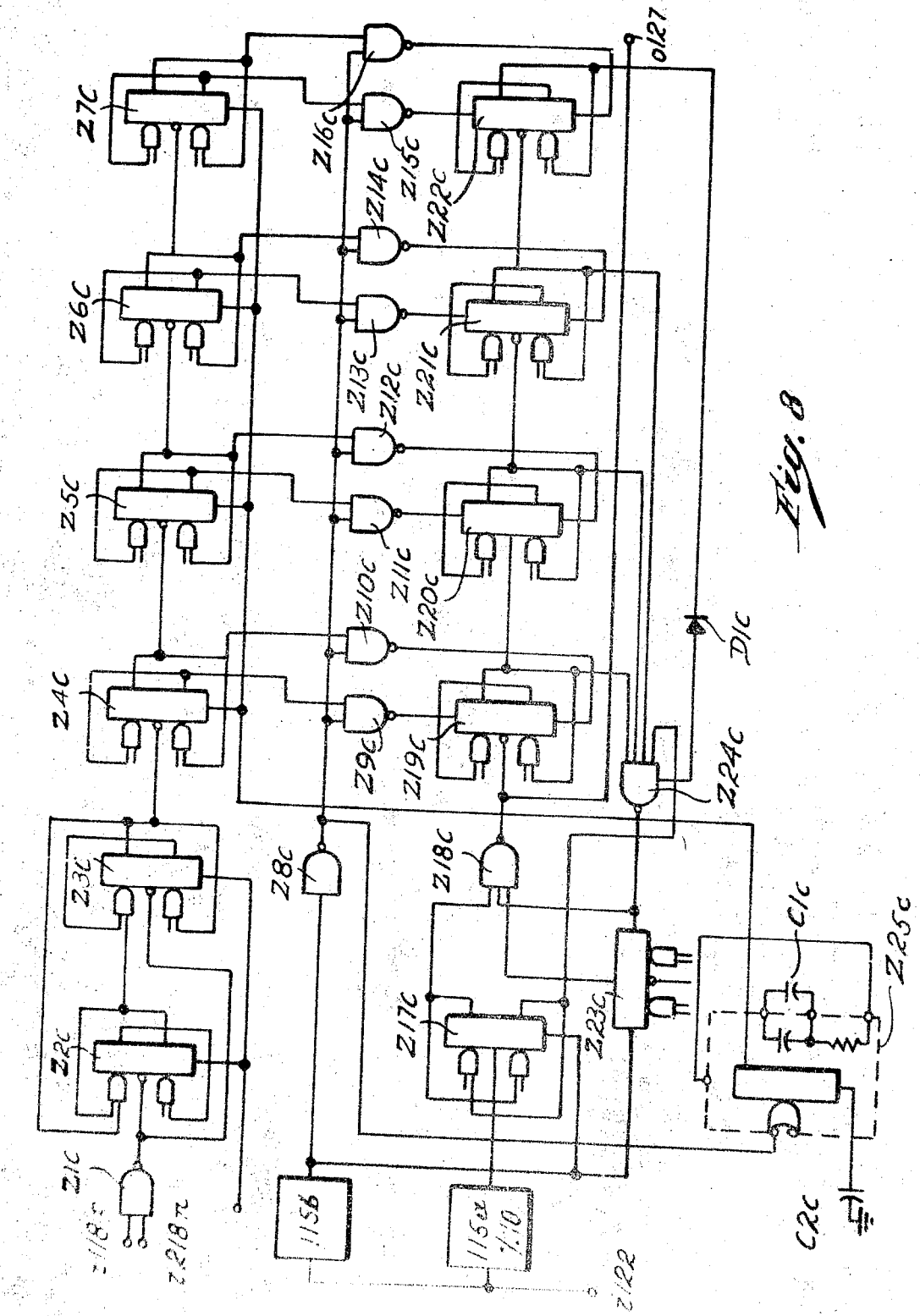
FIG. 8 is a detailed circuit diagram of the cumulative counting group, frame C.

The storage circuit 125 of FIG. 8 has inputs $i$ 118$p$ and $i$ 218$n$ from the respective short gates, pulses from which are added in gate Z1$c$. The pulses from the two inputs never coincide to give a false count, since the gates 118$p$ and 218$n$, associated with different channels, are opened sequentially and never simultaneously. As noted above, each pulse inserted or deleted to correct phase represents 1/300 of a cycle of phase change. To obtain a signal whose pulses each represent one centilane, the input pulses are therefore divided by three in the circuit formed by Z2$c$ and Z3$c$. These pulses in turn are applied to a binary count-up register formed by elements Z4$c$, Z5$c$, Z6$c$ and Z7$c$, which register has a counting capacity of 16.

The storage circuit 125 further has an input $i$ 222 from the synchronizing circuit 122, as mentioned above, which feeds its 100 pps pulse train to a transfer pulse generator 115$b$ and a clock pulse generator 115$a$, both of which are actually part of timing function generator 115 referred to above. The transfer pulse generator 115$b$ delivers a pulse to the pairs of storage circuits 125, 126; 225, 226; 325, 326 to instigate the readout process. The pulses are delivered to the pair in sequence to reduce the power requirements of the receiver, but they are sent simultaneously to both storage circuits forming one pair, such as 125, 126. The clock pulse generator 115$a$ divides the 100 pps signal by 10 to produce a 10 pps clock-pulse train.

When a transfer pulse is delivered to the storage circuit 125, it opens gates Z9$c$ through Z16$c$ to transfer the count in the count-up register to a second register comprised of Z19$c$ through Z22$c$. As the circuit connections show, the tranfer is of the conjugate of the number of accumulated pulses in the count-up register. For example, if the count-up register contained the binary number 0011, this would be transferred as is conjugate 1100 to the count-down register.

The transfer pulse, in addition to causing the conjugate transfer of the stored-up number of pulses, also triggers a delay component Z25$c$ which resets the count-up register to 0000 to begin counting anew.

The transfer pulse furthermore latches Z23$c$ into a state enabling gate Z18$c$ to pass to the count-down register the 5 pps signal derived by dividing the 10 pps clock signal from 115$a$ in binary Z17$c$. The 5 pps signal through gate Z18$c$ at $o$ 127 Passes to comparator and coil driver output 127 (FIG. 9) and also is applied to the count-down register. When enough pulses have been applied to the count-down register to increase the count (from the transferred conjugate value) to 1111, the gate Z24$c$ is activated and unlatched to disable Z18$c$ so that no more pulses will pass to the comparator and coil driver 127 until the next transfer pulse from 115$b$ is applied.

From the foregoing it is readily seen that the storage and count-out circuit 125 functions broadly as follows. The input pulses are divided by three and stored in a count-up register until a transfer pulse causes the count to be transferred as its conjugate to a count-down register. The count-up register is immediately reset so that it will keep counting pulses generated in 117. The transfer pulse also enables a clock-pulse train to deplete the count-down register, at the end of which the circuitry is reset to its initial condition.

Figure 9:
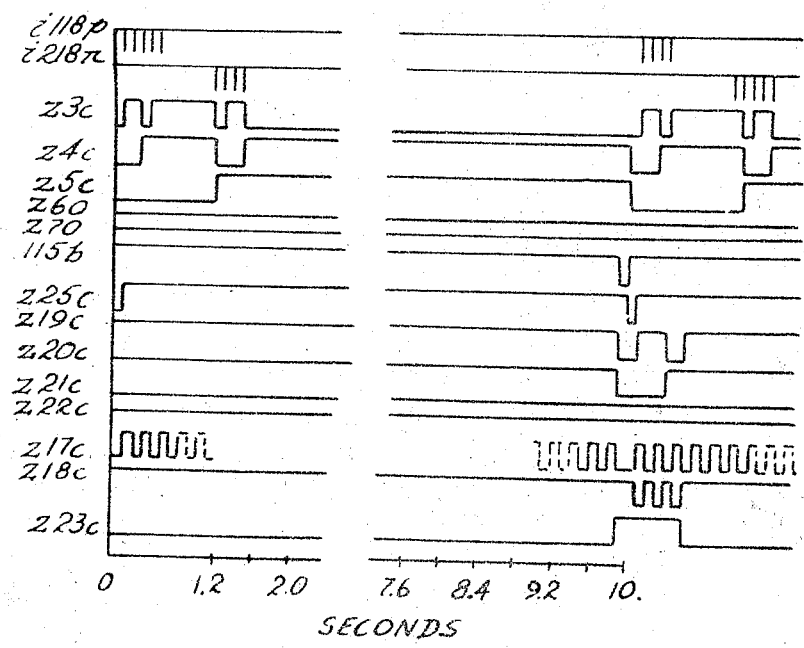
FIG. 9 is a timing diagram illustrating the operation of the storage and count-out circuitry, group C.

FIG. 9 is a timing diagram depicting certain wave forms during a typical 10 second interval of operation of storage and count-out 125, FIG. 8, circuit. The diagram shows five pulses entering this circuit at input $i$ 118p during its short gate and four pulses entering the circuit at input $i$ 218n during its short gate. This total of nine pulses is divided by three, as can be seen at the Z3c output wave form. This number is counted into the register composed of Z4c, Z5c, Z6c, and Z7c as shown by the output wave form of FIG. 9. At the end of the ten second interval a transfer pulse from reset generator 115b shifts the conjugate of this count into the register comprised of Z19c, Z20c, Z21c, and Z22c. In this embodiment, in which the total pulse input is nine in the 10 second interval, the count-up register reads 0011 (or 3) and the transfer to the count-down register is made as 1100. Immediately following transfer, the count-up register is reset to 0000 by a pulse at the output of Z25c, to make it ready to resume counting during the next interval. Binary Z17c accepts 10 pps and provides the 5 pps signal which appears at the output of Z18c when that device is enabled by a change of state at the output of Z24c. Z24c assumes one state enabling Z18c whenever any count not 1111 is present in the count-down register. The output of the enabled 218c counts out the count-down register and provides the signal ultimately fed to terminal o 127 and to the comparator and coil driver 127. As soon as the count reaches 1111, there is a change of state in Z24c, causing Z18c to become inhibited to prevent further pulses from passing, and at the same time setting Z23c into a latching condition to be maintained until the next transfer pulse from 115b occurs at the end of another 10 second cycle.

Figure 10:
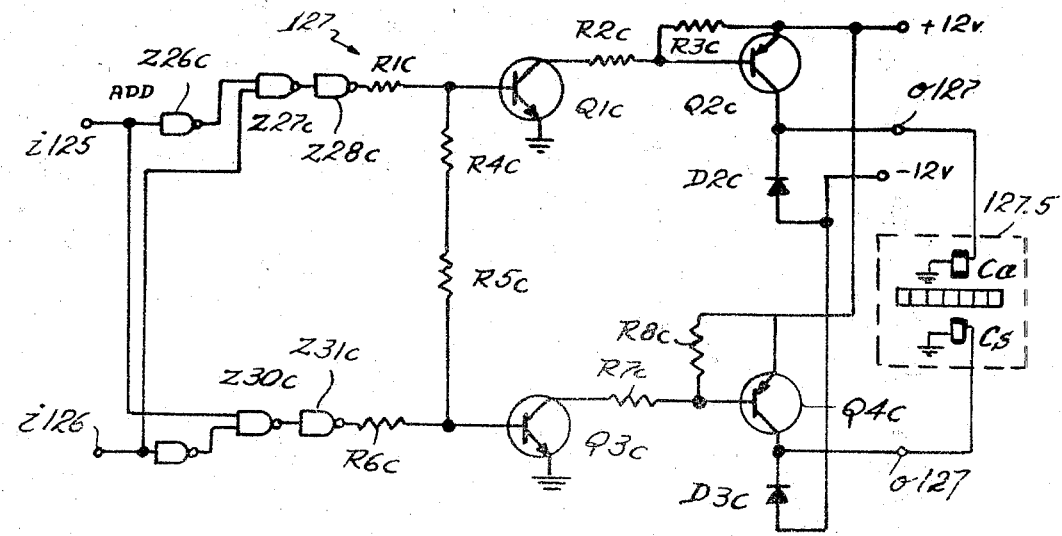
FIG. 10 is a detailed circuit diagram of the comparator and coil driver.

2. Comparator and Coil Driver (FIG. 10)

The pulses from storage circuit 125 are applied to input $i$ 125, and likewise the pulses from storage circuit 126 are applied to input $i$ 126. It is likely that a count will appear at both inputs at the end of any ten second interval. It would be undesirable to have both counts applied to the counter 127.5 simultaneously to buck one another in the coils thereof. Therefore, the two inputs are compared and no pulses are allowed to pass to either the add counter-coil Ca or the subtract counter-coil Cs until the count for one or the other is depleted. Thus, only the net difference between the add and subtract pulses is applied to the counter coils Ca or Cs. Comparison of the pulse counts occurs in gates Z27c and Z30c which will pass pulses from inputs $i$ 125 and $i$ 126 respectively unless inhibited by pulses appearing at the opposite input. Since the pulses at the inputs $i$ 125 and $i$ 126 have the same phase and frequency because they are derived from the same clock pulse generator 115a and started at the same time by a transfer pulse from 115b, it is apparent that the simultaneous pulses will blank one another. Only if one pulse train contains a greater number of pulses than the other will a signal be able to pass through either of gates Z27c or Z30c to the coil driving circuitry and eventually to the coils Ca or Cs. Position indicating pulses which do not cancel are amplified in the coil drivers comprised of transistors Q1c, Q2c or Q4c, Q3c and then applied to the counter coil to be registered on the face of the counter. By comparing the pulses from the two storage circuits 125 and 126 in the manner heretofore explained, counter errors resulting from simultaneous application of signals to the add and subtract counter coils are eliminated.

The nature and electrical connection of the elements of each of the circuit components contained in frame C (including elements of conventional function not expressly described herein to avoid prolixity) are clearly shown in FIGS. 1 and 8 to 10, whereas the exact structure and characteristics or dimensions and ratings so far as material for the proper description of the device are identified in the following list which refers to the numerals of the figures, it being understood that adjustments and mutual correlations have to be applied upon initial testing for the proper performance, according to routine practice in the manufacture of devices of this type. The numerals from 1 to 20 in FIGS. 8 to 10 signify the manufacturer's terminal numbers for the respective devices to which they are applied.

| | |
|---|---|
| Q1c, Q3c | 2N 697 |
| Q2c, Q4c | 2N 4036 |
| Z1c, Z8c through Z16c Z2c through Z7c, Z17c. | type MC 846, 1 gate |
| Z19c through Z23c | type MC 845, flat package type |
| Z18c, Z24c | type MC 830 |
| Z25c | type MC 851 |
| Z26c, Z29c | type MC 830 |
| Z27c, Z28c, Z30c, Z31c | type MC 832 |

Figure 11:
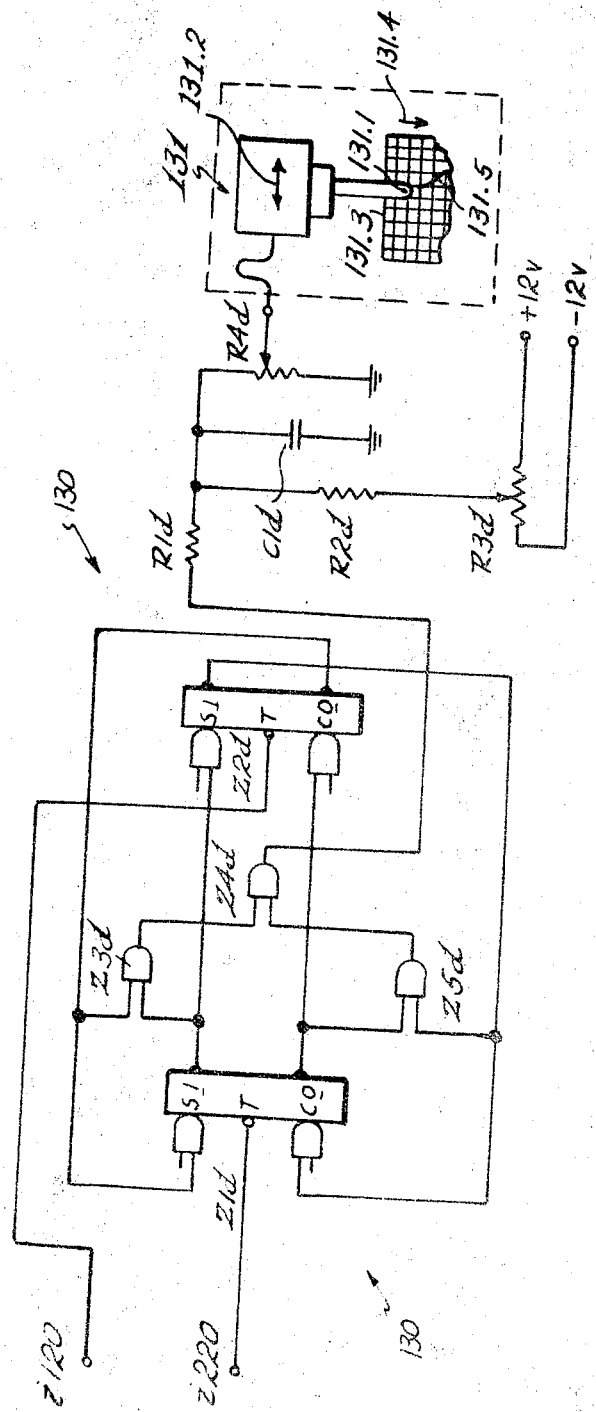
FIG. 11 is a detailed circuit diagram of the lane position recording group, frame D.

D. Graphic Position Display (FIG. 11)

Another form of readout is provided by chart recorders 131, 132 and 133 which are driven by digital phase detectors 130, 230 and 330 respectively, compare (FIG. 2). Each digital phase detector, such as 130, has inputs from two of the local servo channel outputs, such as $i$ 120 and $i$ 220 shown in FIG. 11. The two square wave signals are compared by means of binaries Z1d and Z2d and gates Z3d, Z4d and Z5d. The output from gate Z4d is a square wave whose area is related to the phase difference between the input signals at $i$ 120 and $i$ 220. This signal is integrated by capacitor C1d to form a linear ramp of voltage varying from zero to five volts DC as the input square wave phase difference varies from zero to 360°. Potentiometer R3d provides a zero adjustment, and potentiometer R4d provides a full scale adjustment, for chart recorded 131 to which the ramp signal is applied.

The chart recorder 131 is of conventional type responsive to the magnitude of voltage at its input to position a stylus 131.1 which is free to move in the directions shown by arrow 131.2. A chart 131.3 travels in the transverse direction shown by arrow 131.4 and the combined motions of the stylus and chart generate a tract 131.5 as a permanent record of receiver position, and to provide a visible indication, through use of the grid lines on the chart, of lane crossings and related data.

The nature and electrical connections of the elements of each of the circuit components contained in frame D are clearly shown in FIG. 11, whereas the exact structural characteristics or dimensions and readings so far as material for the proper operation of the device are identified in the following list which refers to the numerals of the figure, it being understood that adjustments and mutual correlations have to be applied upon initial testing for proper performance, according to routine practice in the manufacture of devices of this type. As in previous lists, the numerals from 1 to 20 in FIG. 11 signify the manufacturer's terminal numbers of the respective devices to which they are applied.

| | |
|---|---|
| Z1d, Z2d | type MC 845 |
| Z3d, Z5d | type MC 830 |
| Z4d | type MC 832 |

E. Input Filtering, Amplifying, and Limiting (Frame E, Block 112a)

The signals received from transmitters 10a through 10d must be amplified so as to avoid any but a negligible phase shift, or at least a phase shift which is constant for all received signals, and not dependent upon amplitude or other non-uniform characteristics. The signals must moreover be filtered to reject unwanted frequencies and to ascertain reception of the correct signal. Furthermore, the signal must be limited. These functions are performed in frame E representing block 112a of FIG. 2.

Figure 12:
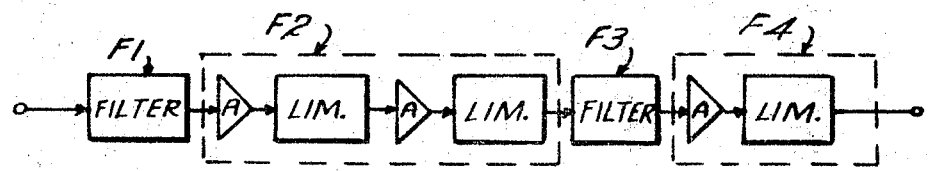
FIGS. 12, 13, 14, 15 and 16 are detailed circuit diagrams of the amplifier group, frame F.

Block 112a comprises four series connected stages including filtering, amplifying, and limiting means. One such stage is illustrated in FIG. 12. As shown there, each stage comprises an input filter F1 (shown in detail in FIG. 13), followed by a section F2 including an amplifier, a first limiter, another amplifier, and a second limiter (details in FIG. 14), followed by an intermediate filter F3 (details in FIG. 15), followed by a section F4 including an amplifier and the third limiter (details in FIG. 16).

The input filter F1 (FIG. 13) is a unity coupled filter having a Butterworth response. This type of response insures a linear phase response with frequency and minimum phase change with amplitude. To further minimize phase shift, both in the amplifier 112a and in the following mixer 112b (compare FIG. 2), it is preferable to use the distributed limiting technique illustrated by the embodiment of FIGS. 12 to 16. This technique insures that the signals transmitted from stations 10a, 10b, 10c or 10d will be always limited prior to limiting of undesired signals outside the desired frequency band centered on the 10.2 KC transmitting frequency. The technique is characterized by rejecting the undesired signals to a degree greater than the amplifier gain to the next limiting point in the circuit. By thus distributing the limiting function of the circuit along with the filtering and amplifying functions, it is possible to obtain high amplification in a narrow bandwidth with minimum phase distortion. Specifically, a discussion of the problems solved by the distributed filtering, amplifying and limiting technique, and a description of the structure and operation to reduce these problems according to the invention, are as follows:

In cases of reception of radio waves at VLF where the limiting factor for sensitivity is not the atmospheric noise background and where amplitude carrier phase information constitute the desired intelligence, significant signal-to-noise improvement is achieved by using a limiting receiver. This is possible because atmospheric noise is impulsive in nature at these frequencies. Clipping the amplitudes of these noise spikes prior to entering high-Q filters is especially desirable since the ringing induced in the filters by these impulses represents in-band interference.

In the case where an adjacent channel exists which must be rejected to a great extent (100 dB or so) lest it operate the limiters, one seeks a compromise which permits limiting in as wide a bandwidth as possible while rejecting the adjacent channel sufficiently such that it does not intermodulate with the desired signal. At the same time, sufficient gain must be provided thru the receiving circuitry to insure that the sensitivity specified at the receiver input is maintained, i.e., that the receiver sensitivity is determined by the noise inherent in the first stage only.

The design of this receiver is based on receiving signals and providing a constant-level signal output at one frequency, specifically 10.2 kHz over a 100 dB dynamic range. The adjacent channel which exists at 11.333 ⅓ kHz is also present over that range and must be rejected. Therefore, a distributed limiting, filtering and amplifying scheme is utilized. Each filter has a 400 Hz nominal bandwidth at 10.2 Kz, wide enough to clamp ringing time on impulses to less than a few milliseconds and narrow enough to provide 18 to 15 dB of gain per stage prior to limiting which is sufficient to insure that the noise inherent in the first stage determined the sensitivity.

The problem of minimizing phase shift with signal level in the filters caused by inductance change as core materials approach saturation, is avoided by the use of stable molybdenum permalloy core material and by preventing AC voltages of greater than 100 millivolts from being impressed across the inductors.

Figure 13:
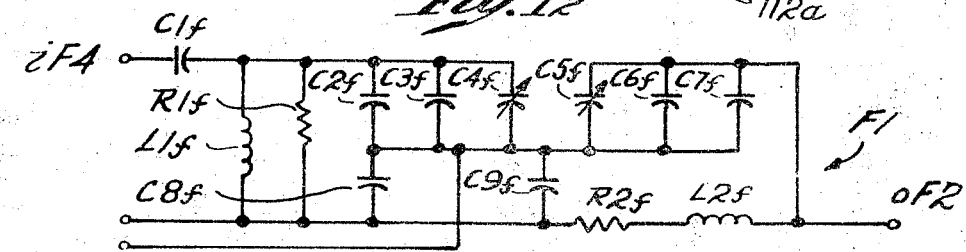
Figure 14:
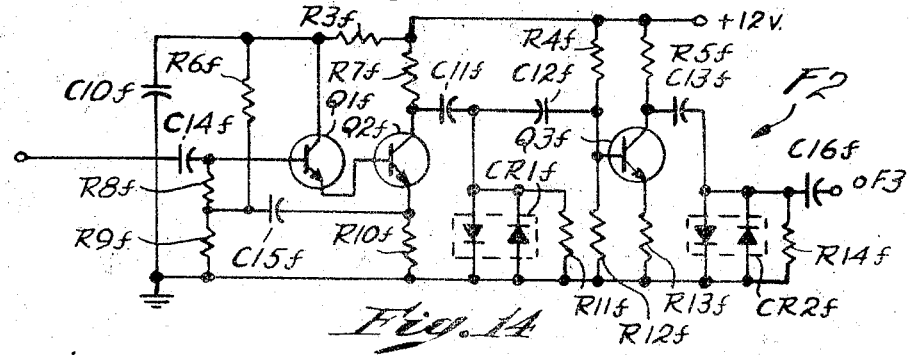
Figure 15:
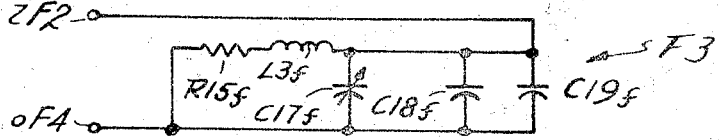
Figure 16:
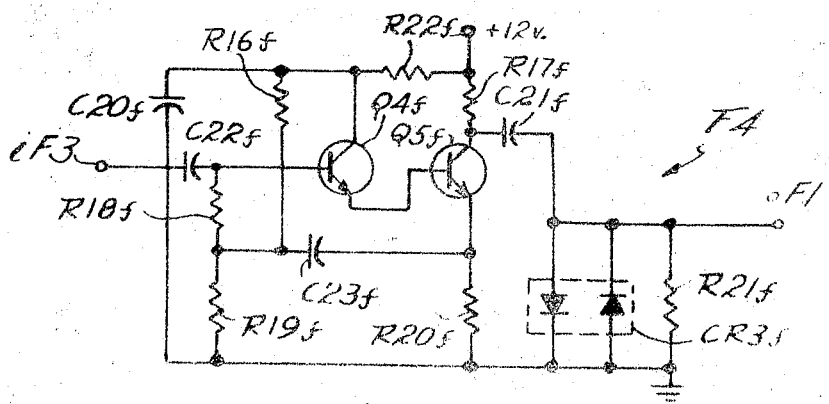

In the particular embodiment of the FIGS. 12 through 16, the two filters shown in FIGS. 13 and 15 have coils with Q-values of the order of a little over 100, which produces, in all eight filter circuits, more than 80 db rejection for frequencies displaced 500 cycles or more from the 10.2 KC center frequency. Each stage, as illustrated in FIG. 12, includes a 27 db gain amplifier, to provide a total of 108 db amplification for block 112a. The 3 db bandwidth is approximately 200 cycles per second.

The nature and electrical connection of the elements of each of the circuit components contained in frame E (including elements of conventional function not expressly described herein to avoid prolixity) are clearly shown for one stage in FIGS. 12 to 16, whereas the exact structure or and characteristics and dimensions and ratings so far as material for the proper description of the device, are identified in the following list which refers to the numerals of the figures, it being understood that adjustments and mutual correlations have to be applied upon initial testing for the proper performance, according to routine practice in the manufacture of devices of this type.

| | |
|---|---|
| Q1f, Q2f, Q3f, Q4f Q5f | 2N 697 |
| CR1f, CR2f, CR3f | type FA 2000 |

It is apparent that other variations and modifications may be made without departing from the present invention. Accordingly, it should be understood that the form of the present invention, described above and shown in the accompanying drawings, is illustrative only and not intended to limit the scope of the invention.

What is claimed is:

1. A navigation system for fixing the location of a vehicle, of the type wherein pairs of transmitters are employed to determine lanes of position defined by phase angle differences of signals from the transmitters, comprising:

a plurality of synchronously operated signal transmitters producing sequentially transmitted, pulsed signals;

first means for receiving said signals from said plurality of transmitters, including signal-pulse generator means for producing a local signal related to said sequentially transmitted signals;

means associated with said first means for detecting consecutive sequences of said transmitted signals, respectively, and for separately comparing their respective phase angles with the phase angle of said local signal;

second means for matching the phase angle of said local signal with the phase angles of the respective transmitted signals during said sequences, said second means including means for converting phase angle differences between the transmitted signals received by the first means and said local signal into a number of discrete pulses generated during the presence of said phase angle differences and for indicating, from the number of said discrete pulses, the magnitude of the respective phase angle differences; and means for correlating said phase angle differences to indicate the position of said vehicle.

2. The system according to claim 1 wherein the transmitted signals and the locally produced local signal are digitally coded, pulsed signals.

3. The system according to claim 2 wherein said phase angle differences define time intervals between the respective signals.

4. The system according to claim 2 wherein said second means includes means for inserting and deleting the phase-difference-defining pulses into and from said local signal, respectively, depending on the sense of the phase difference.

5. The system according to claim 2 wherein said phase-difference-defining means generates pulses at a first point whenever phase difference is of one sense, and at a second point whenever phase difference is of the other sense.

6. The system according to claim 5 wherein said second means includes third means for inserting pulses at said first point into said local signal, and deleting means for deleting pulses at said second point from said local signal.

7. The system according to claim 6 wherein said third means includes an input for said phase-difference-defining pulses, and fourth means responsive thereto and to said local signal for interpolating between two successive pulses of said local signal and additional pulse for each phase-difference-defining pulse appearing at said output.

8. The system according to claim 7 wherein said fourth means includes a first monostable multivibrator placed in triggerable condition by a phase-difference-defining pulse and triggered by the first subsequent local signal pulse, the period of said first monostable multivibrator being less than the interval between successive local signal pulses, and a second monostable multivibrator triggered by said first monostable multivibrator to produce additional pulses, and means for combining said additional pulses with said local signal pulse train.

9. The system according to claim 6 wherein said deleting means includes an input for said phase-difference-defining pulses appearing at said second point and fifth means responsive to said phase-difference-defining pulses and to said local signal pulses for blocking one pulse from the local signal pulse train each time a phase-difference-defining pulse appears at said input.

10. The system according to claim 9 wherein said fifth means includes a monostable multivibrator placed into triggerable condition by a phase-difference-defining pulse and triggered by the first subsequent local signal pulse and a gate inhibited by said monostable multivibrator for a period sufficient to block a single local signal pulse.

11. The system according to claim 6 further comprising means for frequency dividing said local signal with insertions or deletions, to obtain a phase-adjusted comparison signal of the same frequency as said transmitted signal.

12. The system according to claim 11 wherein said second means further includes phase-detector means for comparing the phases of said transmitted signals and said comparison signal, said phase-difference-defining means being responsive to said phase-detector means, thereby to lock the phase of the comparison signal to the phase of the selected sequence of the transmitted signals.

13. The system according to claim 5 wherein said phase-difference-defining means comprises an input, a sawtooth-wave signal generator which has its output frequency controlled by the magnitude of a control voltage at said input, and the polarity of the output sawtooth-wave controlled by the polarity of said control voltage, differentiator means for said output sawtooth-wave signal for producing pulses of corresponding frequency and polarity, and separating means for directing pulses of one polarity to said first location and pulses of the other polarity to the second location.

14. The system according to claim 13 wherein said separating means comprises a first amplifier biased to respond only to pulses of said one polarity and having its output at said first location, and a second amplifier biased to respond only to pulses of said other polarity and having its output at said second location.

15. The system according to claim 13 wherein said matching means comprises phase-detector means with an output voltage of magnitude corresponding to the magnitude of the phase difference and of a polarity corresponding to the sense of the phase difference, said phase-detector output voltage being applied to the input of said phase-difference defining means.

16. The system according to claim 1 wherein said local signal has a frequency which is an integral multiple of the frequency of the transmitted signals applied to said matching means, and wherein said matching means comprises means for inserting and deleting said phase-difference-defining pulses into and from said local signal, respectively, depending on the sense of the phase difference; and means for frequency dividing said local signal with insertions and deletions by said integral multiple, thereby to obtain a phase-adjusted signal at the transmitted signal frequency to compare therewith for phase difference, thereby providing a phase-adjusted comparison signal.

17. The system according to claim 16 wherein said second means further includes phase-detector means responsive to the phase difference between said phase-adjusted comparison signal and said transmitted signal, and wherein said phase-difference-defining means is responsive to said phase-detector means.

18. The system according to claim 1 wherein said means for detecting consecutive sequences of said transmitted impulses comprises a timing-function generator, and gate means for connecting said second means into phase-matching relationship in response to signals from said timing-function generator.

19. The system according to claim 18 wherein said timing-function generator produces gate-controlling signals from an input clock-pulse signal, and said selecting means further comprises means for synchronizing said gate-controlling signals with said consecutive sequences of transmitted signals.

20. The system according to claim 19 wherein said synchronizing means comprises a pulse generator and means for selectively inserting or deleting pulses therefrom into or from the clock-pulse signal operating the timing-function generator, thereby to advance or retard, respectively, the gate-controlling signal.

21. The system according to claim 20 wherein said means for selectively inserting or deleting pulses comprises a first input, means responsive to pulses at said first input for inserting pulses into the clock-pulse signal, a second input, means responsive to pulses at said second input for deleting pulses from said clock-pulse signal, and manual switch means for connecting said pulse generator to one of said first and second inputs.

22. The system according to claim 18 wherein said second means comprises a plurality of means for combining said phase-difference-defining pulses with said local signal, and wherein said gate means connect said combining means to said phase-difference-defining means.

23. The system according to claim 22 wherein said timing-function generator produces a pattern of gate-controlling signals from a clock pulse train, and wherein said selecting means comprises synchronizing means for advancing and retarding said pattern to cause said consecutive sequences of transmitted impulses to be contemporaneous with the connection of selected ones of said plurality of combining means, to said phase-difference-defining means, thereby to associate each sequence of transmitted signals with a single combining means.

24. The system according to claim 23 wherein said synchronizing means comprises a pulse generator, and means for selectively inserting or deleting pulses therefrom into or from the clock pulse train operating the time function generator, thereby to advance or retard, respectively, the gate-controlling signal.

25. The system according to claim 1 wherein said correlating means, for phase-difference-defining pulses generated for a pair of transmitting stations, comprises:

means for counting the number of pulses generated, numerical display means, and means for changing the indication of said numerical display means in accordance with the number of pulses generated.

26. The system according to claim 25 wherein, for each transmitting station, said phase-difference-defining pulses are generated at a first location for one sense of phase difference and at a second location for the other sense of phase difference and wherein said counting means comprises a first partial sum means for counting together pulses appearing at the first station's first location and the second station's second location; a second partial sum means for counting together pulses appearing at the first station's second location and the second station's first location, and means for combining the counts of said first and second partial sum means to produce a number of pulses equal to the difference therebetween for application to the indication changing means.

27. The system according to claim 26 wherein each of said partial sum means comprises means for storing the accumulated count and means for periodically transferring the count, and resetting said storing means to an empty condition.

28. The system according to claim 27 wherein said count is periodically transferred to a register which is depleted by a clock pulse signal, and wherein gate means pass said clock pulse signal, between the times of transfer and full depletion, to said combining means.

29. The system according to claim 27 wherein said first and second partial sum means each periodically emit a number of countout pulses equal to their accumulated count, and wherein said combining means comprises first gate means for passing countout pulses from the first partial sum means and second gate means for passing countout pulses from the second partial sum means, said gates each being inhibited by countout pulses appearing at the opposite gate, thereby to block simultaneous countout pulses and to pass only countout pulses representing the difference between their respective numbers.

30. The system according to claim 29 wherein said numerical display means comprises an electromagnetic counter having a coil for increasing the count and a coil for decreasing the count, said coils being responsive respectively to countout pulses passed by said first and second gate means, whereby said combining means prevents said coils from responding simultaneously.

31. The system according to claim 1 wherein said correlating means includes chart recorder means for indicating the position of said first means.

32. The system according to claim 31 wherein said second means includes means for inserting and deleting said phase-difference-defining pulses into and from said local signal during said sequences, and independent means for dividing the generator pulses with insertions and deletions to produce for each sequence a comparison signal with a phase adjustment, and wherein said correlating means comprises phase-detector means for comparing a pair of said comparison signals and said chart recorder means is responsive to said phase-detector means for indicating the position of the first means with respect to the transmitters corresponding to a respective pair of comparison signals.

33. The system according to claim 1 wherein said first means includes an antenna and means for amplifying and filtering the antenna output characterized in that said amplifying and filtering means includes limiting means and said amplifying, filtering, and limiting functions are distributed successively in each of a plurality of stages, thereby to minimize phase shift.

34. The system according to claim 33 wherein said amplifying, filtering, and limiting means are correlated so that said transmitted signals are limited at an earlier stage than undesired signals outside the filter bandwidth.

* * * * *